United States Patent
Williams

[15] 3,691,535

[45] Sept. 12, 1972

[54] SOLID STATE MEMORY ARRAY

[72] Inventor: Thomas R. Williams, Stow, Mass.

[73] Assignee: Sperry Rand Corporation

[22] Filed: June 15, 1970

[21] Appl. No.: 46,350

[52] U.S. Cl. ..............340/173 PP, 307/205, 307/238

[51] Int. Cl. .......G11c 11/40, G11c 7/00, G11c 11/00

[58] Field of Search .....340/173 R, 173 PP; 307/238, 307/279, 304, 205; 317/235 B

[56] References Cited

UNITED STATES PATENTS

| | | | |
|---|---|---|---|
| 3,508,211 | 4/1970 | Wegener | 340/173 |
| 3,387,286 | 6/1968 | Dennard | 340/173 |
| 3,533,089 | 10/1970 | Wahlstrom | 340/173 |
| 3,549,911 | 12/1970 | Scott | 307/279 |
| 3,373,295 | 3/1968 | Lambert | 307/238 |

*Primary Examiner*—Malcolm A. Morrison
*Assistant Examiner*—James F. Gottman
*Attorney*—S. C. Yeaton

[57] ABSTRACT

A memory array is made up of rows and columns of memory elements. Each memory element includes a known type of variable threshold insulated gate field effect transistor characterized by electrically controllable conduction thresholds established by potentials applied between the respective gate electrodes and substrates. Each of the variable threshold transistors in a given row has its gate electrode connected to a word line common to that row and its drain electrode capacitively coupled to the same word line. Each of the variable threshold transistors in a given column has its source electrode connected to a bit line common to that column. Information is written into the memory by first setting all of the variable threshold transistors to a given threshold and then reversing the threshold of certain variable threshold transistors selected in accordance with the information to be stored. Information is read out of the memory by means of a two-part readout cycle in which all of the variable threshold transistors corresponding to a selected word are subjected to a sampling pulse during which time actual readout occurs; then to a restoration pulse which subjects the variable threshold transistors corresponding to the selected word to potentials opposite to that of the sampling pulse.

6 Claims, 4 Drawing Figures

INVENTOR.
THOMAS R. WILLIAMS
BY Joseph M. Roehl
ATTORNEY

INVENTOR.
THOMAS R. WILLIAMS
BY Joseph M. Roehl
ATTORNEY

PATENTED SEP 12 1972 3,691,535

INVENTOR.
THOMAS R. WILLIAMS
BY Joseph M. Raehl
ATTORNEY

SOLID STATE MEMORY ARRAY

The invention described herein was made in the performance of work under a NASA contract and is subject to the provisions of Section 305 of the National Aeronautics and Space Act of 1958, Public Law 85-568 (72 Stat 435; 42 USC 2457).

BACKGROUND OF THE INVENTION

1. Field of the Invention

The invention relates to computer memory circuits and more specifically to computer memory circuits employing variable threshold insulated gate field effect transistors as memory elements.

2. Description of the Prior Art

Copending patent applications Ser. No. 648,414, now U.S. Pat. No. 3,508,211, entitled, "Electrically Alterable Non-Destructive Readout Field Effect Transistor Memory" and Ser. No. 767,230, now U.S. Pat. No. 3,590,337, entitled, "Plural Dielectric Layered Electrically Alterable Non-Destructive Readout Memory Element," filed in the name of Horst A. R. Wegener and assigned to the present assignee, relate to varieties of variable conduction threshold insulated gate field effect transistor memory elements. Each element is comprised of a variable threshold insulated gate field effect transistor whose conduction threshold is electrically alterable by impressing a binary polarity voltage between the gate electrode and the substrate in excess of a predetermined finite magnitude. The polarity of the voltage determines the sense in which the threshold is varied. Upon the application to the gate electrode of a fixed interrogation voltage having a value intermediate the binary valued conduction thresholds, the binary condition of the transistor can be sensed by monitoring the magnitude of the resulting source-drain current. The magnitude of the interrogation voltage is insufficient to change the pre-existing conduction threshold so that non-destructive readout is achieved.

The value of the variable threshold transistor memory elements lies partly in the fact that they are completely compatible with the use of integrated microelectronic circuit fabrication techniques and devices used in digital computers.

Prior art memory arrays using the aforementioned variable threshold transistor memory elements are capable of storing binary information for considerable time intervals. The memory array of the present invention permits the binary information to be stored for time intervals significantly in excess of those time intervals associated with the prior art devices.

SUMMARY OF THE INVENTION

The effective storage time of a variable threshold insulated gate field effect transistor memory is prolonged by providing means to restore charge to the gate insulator of a variable threshold transistor in the memory each time that information is read out of that variable threshold transistor.

DESCRIPTION OF THE PREFERRED EMBODIMENT

Figure 1:
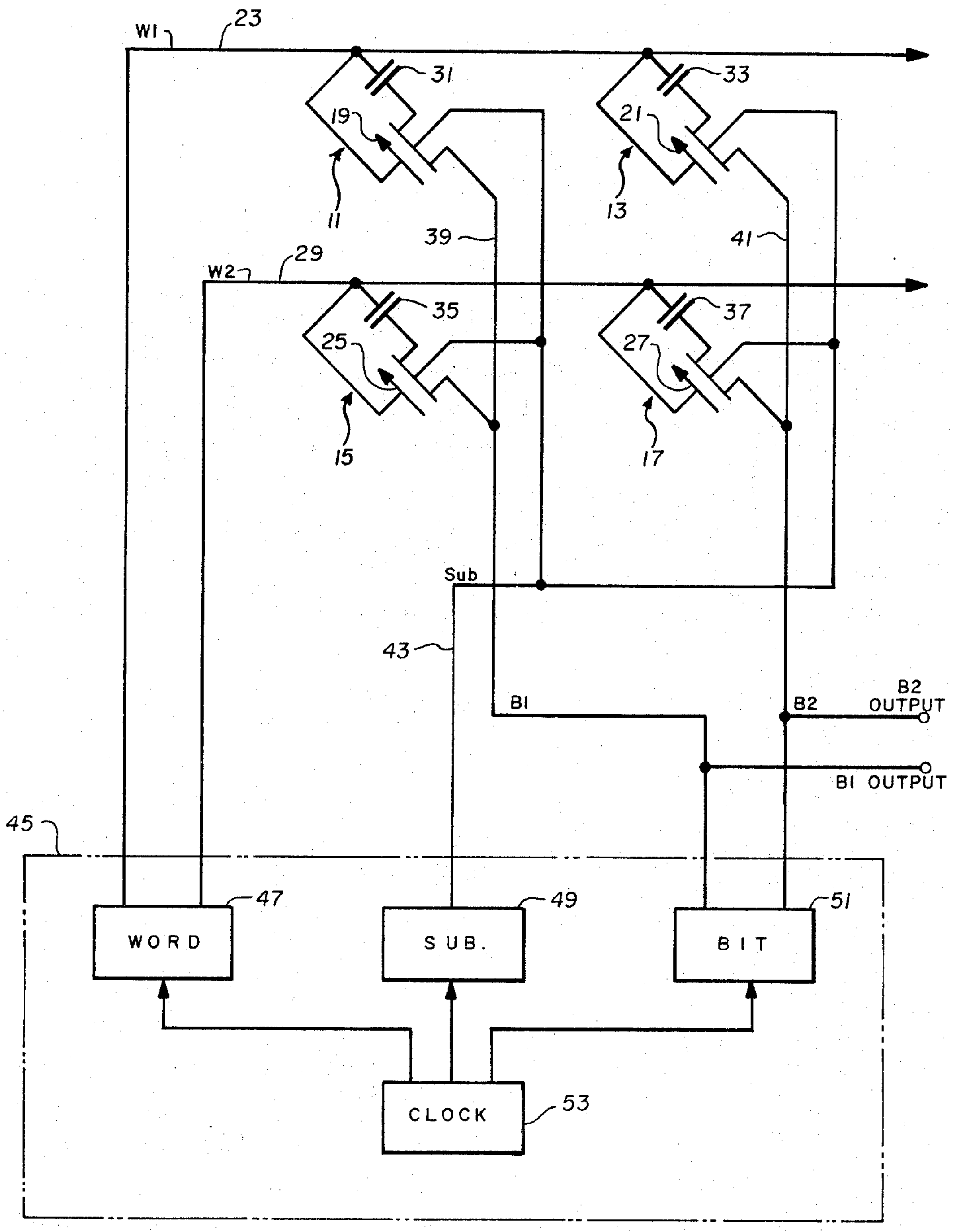
FIG. 1 is a schematic drawing of a memory array employing the principles of the invention.

A two-word, two-bit memory employing the principles of the invention is illustrated in FIG. 1.

Memory elements 11 and 13 are used in storing information contained in a first word. Memory elements 15 and 17 are used in storing information contained in a second word. Each memory element contains a variable threshold insulated gate field effect transistor such as the transistor 19 in the memory element 11. The gate electrodes of the variable threshold transistor 19 and the variable threshold transistor 21 are connected directly to a word line 23. Variable threshold transistors 25 and 27 have their gate electrodes connected directly to a word line 29. The drain electrodes of the transistors 19 and 21 are capacitively coupled to the word line 23 through capacitors 31 and 33 respectively, whereas the drain electrodes of the transistors 25 and 27 are capacitively coupled to the word line 29 through capacitors 35 and 37 respectively. The sources of the variable threshold transistors 19 and 25 are connected to a bit line 39 whereas the source electrodes of the variable threshold transistors 21 and 27 are connected to a bit line 41.

The substrates of all transistors are connected to a substrate line 43.

In the particular embodiment shown, the transistors 19 and 21 are arranged in a row for storing a first word W1. The transistors 25 and 27 are arranged in a second row for storing bits in a second word W2. The transistors 19 and 25 are arranged in a first column for storing the first bit B1 in the words to be stored and the transistors 21 and 27 are arranged in a second column for storing the second bit B2 in the words to be stored.

Voltages to be applied to the memory elements are obtained from a logic means 45. Voltages applied to the word lines W1 and W2 are supplied by the word source 47. Substrate voltages are applied from a substrate source 49 and bit voltages are applied from a bit source 51. A clock source 53 determines the timing of the voltages to be applied to the memory array from the word, substrate and bit sources.

The timing and magnitude of the voltage pulses applied from the various sources will be described later.

Figure 2A:
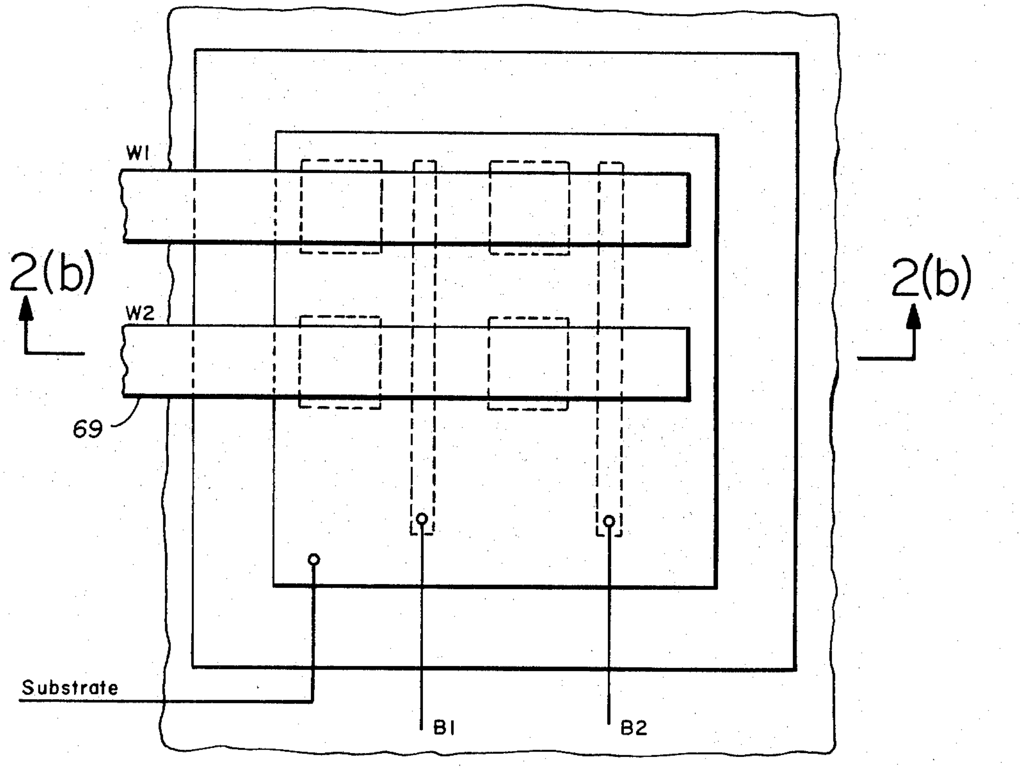
FIG. 2(*a*) and FIG. 2(*b*) are drawings illustrating the structure of the array of FIG. 1 incorporated in an integrated circuit memory.
Figure 2B:
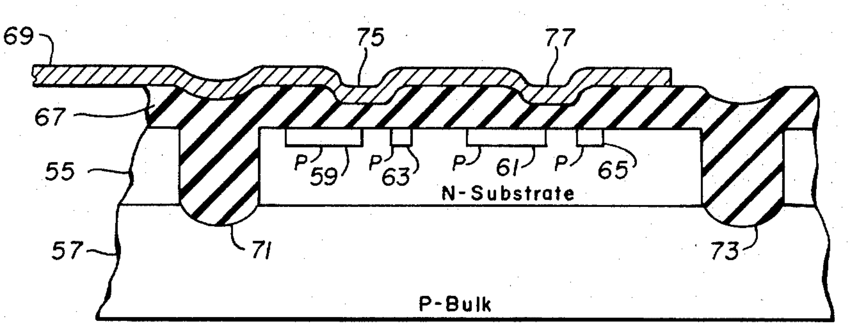

FIG. 2(*a*) and FIG. 2(*b*) illustrate how a typical memory array of the type pictured in FIG. 1 may be fabricated as an integrated circuit. A substrate may contain an N portion 55 formed over a P-type bulk section 57. Drain sections 59 and 61 and source sections 63 and 65 may be diffused into the N layer 55 by known techniques. An insulating layer 67 may then be deposited over the N-type portion 55 and a metal electrode 69 deposited over the insulator. Isolation regions 71 and 73 may be formed to isolate the memory array from surrounding devices.

Variable threshold field effect transistors ordinarily contain a dual layer insulator 67 as taught in the aforementioned copending U.S. Pat. application Ser. No. 767,230. The drain electrodes are capacitively coupled to the metal electrode 69 through the insulating layer 67. The source electrodes are connected directly to the bit lines B1 and B2. The gate electrodes are formed by the depressed sections 75 and 77 of the electrode 69.

Figure 3:
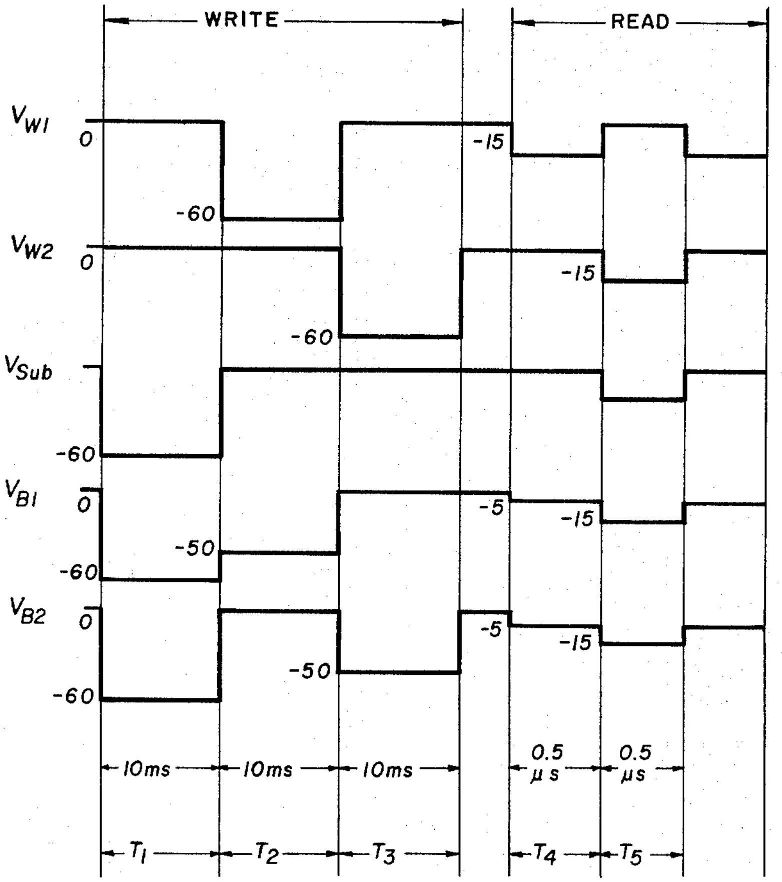
FIG. 3 is a diagram illustrating the voltage relationships occurring during operation of the circuit of FIG. 1.

FIG. 3 represents a timing diagram showing voltage relationships that may be used in operating the circuit of FIG. 1. The diagram of FIG. 3 illustrates a WRITE cycle for writing information into the memory elements of the array and a two-part READ cycle for reading information out of the array. The various voltages applied to the variable threshold transistor elements are supplied from the sources in the logic circuit 45 of FIG. 1. The time intervals for applying these voltages are determined by the clock circuit 53 of FIG. 1.

The voltages applied to the various elements during the WRITE cycle are applied for 10 millisecond intervals as indicated in FIG. 3. The various voltages applied during the READ cycle are applied for 0.5 microsecond intervals. The design of the logic circuit 45 is straightforward and does not require an extended explanation. The operation of the memory array may be understood by referring to the schematic diagram of FIG. 1 together with the timing diagram of FIG. 3.

Assume, by way of example, that a binary ONE is to be written into memory element 13. In brief, this will entail three steps during the WRITE period:

1. During $T_1$, set all memory elements to ZERO.
2. During $T_2$, set memory element 13 to ONE, and leave elements 11, 15 and 17 set to ZERO.
3. During $T_3$, set the desired bit pattern in Word 2, and leave Word 1 unaltered.

These three steps may be implemented as follows:

During time interval $T_1$, the memory is prepared for a WRITE cycle by first clearing each memory element. This is accomplished by setting the word lines W1 and W2 to ground potential. The substrate and bit lines are set to a −60 volt potential. Since all gate insulator voltages are referred to the voltage at the substrate interface, this places a potential of +60 volts across the gate insulator of each variable threshold transistor. The capacitors in each of the memory elements block the flow of d.c. current from the word lines during this portion of the cycle. After the imposition of the aforementioned voltages, the thresholds of each of the variable threshold transistors are set to the positive threshold value.

During $T_2$, the desired bit pattern for word W1 is entered into the memory elements 11 and 13.

It will be remembered that memory element 11 is to store a binary ZERO and memory element 13 is to store a binary ONE, and that a binary ZERO is represented by conduction during the READ cycle whereas a binary ONE is represented by non-conduction during the READ cycle.

In order to enter word W1 into the memory array, the word line 23 will be set to a potential of −60 volts, the bit line B1 will be set to a potential of −50 volts. The word line 29, the substrate line 43, and the bit line B2 will be grounded. This condition is illustrated in the second 10 millisecond interval of the WRITE cycle depicted in FIG. 3.

Since the gate electrode of the transistor 19 is now at −60 volts whereas the source electrode is at −50 volts and the substrate at ground potential, a conducting channel will be formed in the transistor 19. The channel and the drain adopt the source potential of −50 volts so that there is only a 10 volt potential applied across the gate insulator and the previously set positive threshold is not disturbed.

At the same time, a −60 volt potential is applied across the gate insulator of the transistor 21 so that this threshold is shifted to its negative value.

The voltage across the gate insulators of the transistors 15 and 17 representing the word W2 will be at zero volts during the same portion of the WRITE cycle so that the positive threshold on these transistors will not be disturbed.

During the following 10 millisecond interval ($T_3$) of the WRITE cycle, information corresponding to the word W2 will be written into the memory array in the same fashion.

Information is read out of the memory array during the READ cycle. The READ cycle contains two portions: A SAMPLE portion occurs during the first 0.5 microsecond interval ($T_4$) of the READ cycle and a RESTORE portion occurs during the second 0.5 microsecond interval ($T_5$) of the READ cycle. The information corresponding to word W1 is first sampled. During this portion of the cycle, a −15 volt potential is applied to the word line 23; −5 volt potentials are applied to both bit lines; the substrate and the word line 29 associated with word W2 are grounded.

Since the transistor 19 was undisturbed during the WRITE cycle so that a positive threshold remains on this transistor, a source-to-drain current is supplied to the bit line B1 indicating that a binary ZERO was stored in this transistor.

The threshold of the transistor 21 was shifted to a negative value during the WRITE cycle. Therefore this transistor will not conduct during the READ cycle. This indicates that a binary ONE was stored in the memory element 13.

The RESTORE portion of the READ cycle is next applied to the memory array. During this portion of the cycle, the word line 23 corresponding to the word W1 is set to ground potential. The bit lines B1 and B2, the substrate and the word line 29 corresponding to word W2 are all set to a potential of −15 volts. Under these conditions, a potential is applied across the gate insulators of the transistors 19 and 21 which is opposite to that which was applied during the SAMPLE portion of the READ cycle.

The transistors 25 and 27 corresponding to the word W2 had no potential applied across their gate insulators during the entire READ cycle; therefore, no restoration is necessary at this time.

A second READ cycle is next applied to the memory array in order to read information out of the array corresponding to the word W2.

Experience has shown that a simple readout scheme, such as a d.c. readout, when applied to prior art variable threshold transistor type memory arrays of the type herein considered, are able to store useable information for time durations in the order of 100 hours. With the memory array of the present invention, however, useable information can still be detected after about 4,000 hours of storage. Thus an improvement of about 40 times may be realized over simple methods using d.c. readout voltages by employing the circuit and readout principles of the present invention.

It will be appreciated that a memory array capable of storing only two words of two bits per word has been described as a matter of convenience. In most situations, greater storage capacity would ordinarily be desired. The same principles would apply to a memory array of any reasonable size.

It will also be appreciated that P-type enhancement transistors have been assumed. Opposite conductivity types may be used by reversing the polarities of the various voltages where necessary.

While the invention has been described in its preferred embodiment, it is to be understood that the words which have been used are words of description rather than limitation and that changes may be made within the purview of the appended claims without departing from the true scope and spirit of the invention in its broader aspects.

I claim:

1. A digital memory circuit comprising an array of rows and columns of memory elements formed on a common substrate, each of said memory elements including a variable threshold insulated gate field effect transistor having drain and source electrodes and a gate electrode separated from said substrate by a gate insulator, means to drive all of said transistors to a first threshold, means to drive selected transistors to a second oppositely-polarized threshold in accordance with information to be stored, means to apply a sampling potential across the gate insulator of all of the transistors in a selected row, said sampling potential having a polarity such as to form a conducting channel in the transistors that remain at their first threshold, means to apply a bias voltage to the source electrodes of all transistors during the occurrence of a sampling potential, means to pas a source-drain current through those transistors having a conducting channel formed therein in response to a bias voltage, means to detect the occurrence of a source-drain current in a given transistor, and means to apply a restoring potential to the transistors in said selected row after the application of a sampling pulse, said restoring potential having an amplitude that is equal and opposite to that of said sampling potential.

2. The memory circuit of claim 1 wherein said transistors are P-type enhancement transistors and wherein said first and second thresholds are positively and negatively polarized respectively.

3. The memory circuit of claim 2 wherein the means to set all of said transistors to a positive threshold includes a word line corresponding to each row of memory elements, said word line being connected directly to the gate electrode of each transistor in the corresponding row and capacitively coupled to the drain electrodes of the same transistors, a bit line corresponding to each column of memory elements, said bit line being connected to the source electrode of each transistor in the corresponding column, a substrate line connected to the common substrate, and means to apply a negative potential to said bit and substrate lines while holding said word lines at ground potential.

4. The memory circuit of claim 3 wherein the means to set selected transistors to a negative threshold includes means to set a word line containing the selected transistors to a negative potential while holding the substrate at ground potential, said means to set selected transistors to a negative threshold further including means to set those bit lines corresponding to columns containing a selected transistor at ground potential while holding the bit columns at a negative potential less than the potential of said word line.

5. The memory circuit of claim 4 wherein the means to apply a sampling potential includes means to drive a selected word line to a negative potential having a magnitude less than the potential used to set transistors to a threshold while holding the substrate lead at ground potential.

6. A digital memory circuit comprising an array of rows and columns of memory elements formed on a common substrate, each of said memory elements including a variable threshold insulated gate field effect transistor having drain and source electrodes and a gate electrode separated from the substrate by a gate insulator, means to apply a first positive potential across the gate insulator of each transistor in the array whereby each transistor is set to its positive threshold, means to apply a first negative potential across the gate insulators of selected transistors in said array in accordance with information to be stored whereby the selected transistors are set to their negative threshold value, readout means in said memory circuit, said readout means including sampling means to apply a sampling voltage to any selected row of memory elements, said sampling means including means to apply a second negative voltage across the gate insulator of the transistors in said selected row, said second negative voltage having a magnitude less than said first negative voltage, said sampling means further including means to apply a negative bias voltage to all bit lines in said memory circuit during the application of said second negative voltage whereby a current will be caused to flow in the bit lines connected to those transistors that are set to their positive threshold, and restoring means in said readout means for applying a restoring potential across the gate insulator of the transistors in said selected row of memory elements, said restoring potential having a magnitude equal and opposite to that of the sampling voltage.

* * * * *